United States Patent [19]

Mizuno et al.

[11] Patent Number: 5,355,228

[45] Date of Patent: Oct. 11, 1994

[54] CAMCORDER INCORPORATING A CAVITY FOR STORING A REMOTE CONTROLLER THEREIN

[75] Inventors: Masami Mizuno; Masayuki Kimura, both of Katsuta; Takayuki Nakajima, Hitachi; Takeshi Kawarai; Masanori Numa, both of Ibaraki; Takahiro Nakata; Kazuo Tsukiyama, both of Katsuta, all of Japan

[73] Assignees: Hitachi, Ltd., Tokyo; Hitachi Tokai Engineering Co., Ltd., Ibaraki; Hitachi Video & Information System, Inc., Kanagawa, all of Japan

[21] Appl. No.: 897,008

[22] Filed: Jun. 11, 1992

[30] Foreign Application Priority Data

Jun. 24, 1991 [JP] Japan .................. 3-151451

[51] Int. Cl.⁵ .............................. H04N 5/76
[52] U.S. Cl. .................................. 358/335
[58] Field of Search .............. 358/335, 209, 210, 906, 358/909, 194.1; H04N 5/225

[56] References Cited

U.S. PATENT DOCUMENTS

| | | | |
|---|---|---|---|
| 4,450,487 | 5/1984 | Koide | 358/335 |
| 4,943,867 | 7/1990 | Suetaka et al. | 358/342 |
| 5,146,353 | 9/1992 | Isoguchi et al. | 358/909 |

FOREIGN PATENT DOCUMENTS

| | | |
|---|---|---|
| 59-210778 | 11/1984 | Japan . |
| 63-044393 | 2/1988 | Japan . |
| 435277 | 6/1992 | Japan . |

*Primary Examiner*—Tommy P. Chin
*Assistant Examiner*—Robert Chevalier
*Attorney, Agent, or Firm*—Fay, Sharpe, Beall, Fagan, Minnich & McKee

[57] ABSTRACT

An imaging device comprises a camera, a video cassette recorder, a cassette compartment outer wall which is provided on the video cassette recorder and which is opened and closed when a cassette is inserted or removed, and a remote controller. A cavity, accessible when the cassette compartment is open, is provided for storing the remote controller in the cassette compartment outer wall.

14 Claims, 7 Drawing Sheets

CAMCORDER INCORPORATING A CAVITY FOR STORING A REMOTE CONTROLLER THEREIN

BACKGROUND OF THE INVENTION

The present invention relates to an imaging device or camcorder, having an incorporable remote controller.

Today, virtually all video cassette recorders are remote-controllable. Also on the market are imaging devices, for example VTR-integrated cameras (hereinafter referred to as camcorders), with which a remote controller can be used. A remote controller is very convenient. However, when not in use, it is often put away or lost. Consequently, a user frequently experiences the inconvenience of not having a remote controller readily available when he or she wants to use it. Therefore, if a place for storing a remote controller were provided in the body of the imaging device, or camcorder itself, the above-described inconvenience would be eliminated. Accordingly, there exists, for example, the invention described in Japanese Patent Laid-Open No. 63-44393, in which a remote controller of the same size as a cassette is stored in a cassette holder of a cassette tape recorder. This method, however, has the disadvantage that the remote controller and, of course, the main device itself, cannot be used once the remote controller has been stored away in the cassette compartment.

SUMMARY OF THE INVENTION

An object of the present invention is to provide an imaging device, or camcorder, in which a remote controller can be stored.

Another object of the present invention is to make operation of the buttons of a remote controller possible while the remote controller is stored inside the imaging device.

A further object of the present invention is to make it possible to determine, in a simple manner from outside, whether the remote controller has.

A still further object of the present invention is to prevent a remote controller from being inserted in an incorrect manner into an imaging device.

In order to solve the problems described above, in the present invention a remote controller is stored in the camcorder itself. In particular, the remote controller is incorporable in the cassette compartment outer wall.

If a thin remote controller is stored in the cassette compartment outer wall the size of the camcorder will not be significantly increased. Moreover, since most cassette compartments, to facilitate cassette insertion and removal, are constructed so as to be inclined when open, a remote controller can be inserted in and removed easily from the cassette compartment outer wall.

DESCRIPTION OF THE PREFERRED EMBODIMENT

One embodiment of the invention will be explained using the figures.

Figure 1:
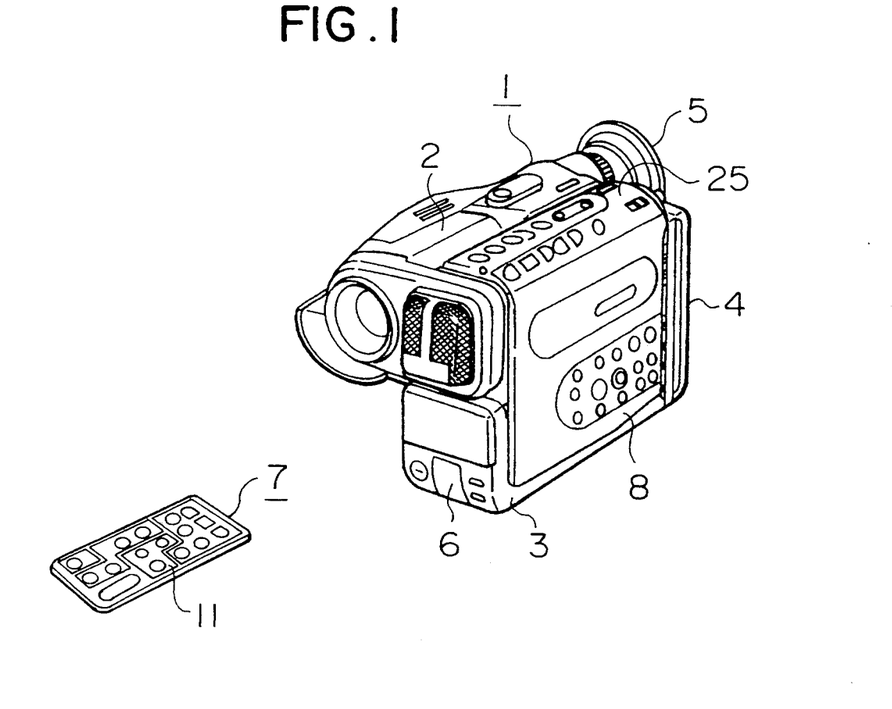
FIG. 1 is an oblique view of an embodiment of the invention showing a remote controller removed from and being used for operating a camcorder.

FIG. 1 is an oblique view of a camcorder 1 and remote controller 7 of an embodiment of the invention. Camcorder 1 comprises a camera portion 2 and a VCR portion 3. Optical signals are converted by camera portion 2 into electrical image-signals, which are converted by VCR portion 3 into magnetic signals, which are recorded on, and played back from, cassette tape 33 (see FIG. 4) held in cassette compartment portion 8. A viewfinder 5 is disposed at the rear of camera portion 2 and is used to check that which is being filmed at any moment. Batteries 4 are secured to the rear end of VCR portion 3 and provide a source of electricity for the camcorder. On the front surface of VCR portion 3 is disposed a light receptor 6 which receives optical signals sent by remote controller 7. FIG. 1 shows remote controller 7 removed from camcorder 1. By using the remote controller, an operator can remotely operate camcorder 1.

Figure 2:
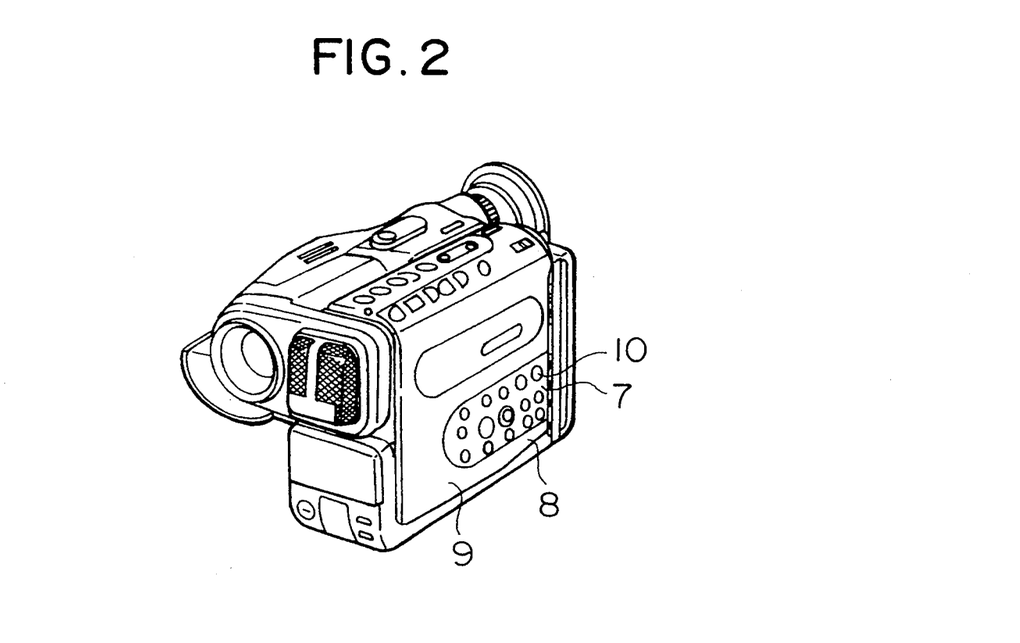
FIG. 2 is an oblique view showing a camcorder with the remote controller put inside.

FIG. 2 is an oblique view showing remote controller 7 stored in cassette compartment outer wall 9 as described hereafter, and shows the operability of camcorder 1 in this state. Cassette compartment outer wall 9 is secured to cassette compartment portion 8, and by operating each operating button 10 of camcorder 1, remote controller 7 can be operated even when it is in a stored state.

Figure 3:
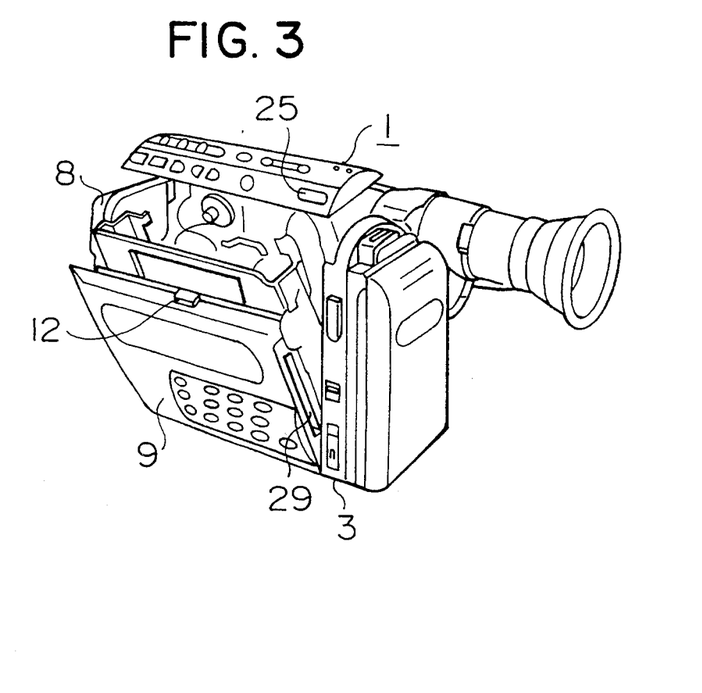
FIG. 3 is an external oblique view showing the cassette compartment outer wall open.

FIG. 3 is an oblique view from outside showing the camcorder illustrated in FIG. 2 from the rear right (relative to FIG. 2), with the cassette compartment outer wall in an open position.

Figure 4:
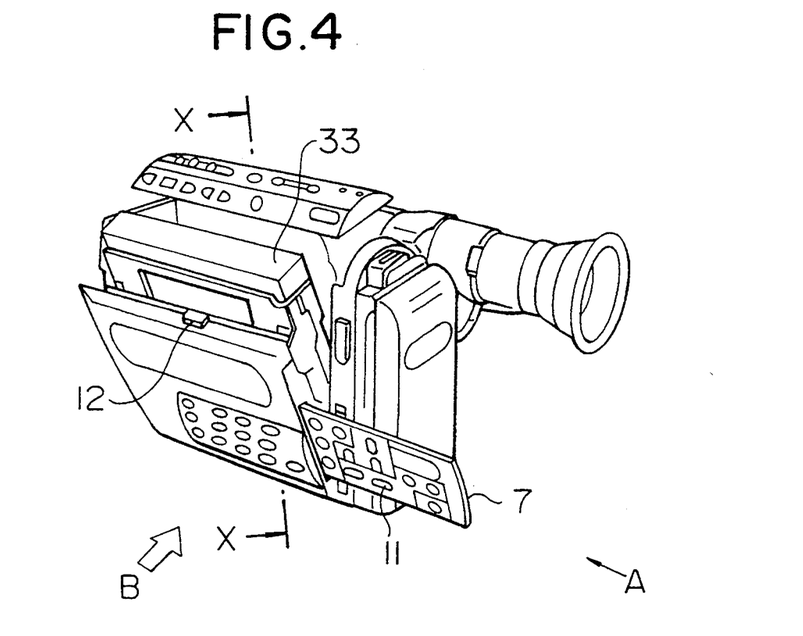
FIG. 4 is an external oblique view showing a cassette tape in place and the remote controller being inserted.

When the cassette eject button 25 on camcorder 1 is pressed, a change from the cassette storage state shown in FIG. 2 to the cassette removal state shown in FIG. 3 is produced. The cassette compartment portion 8 inclines outward from VCR portion 3 and thus cassette 33 can be removed with ease. In the state shown in FIG. 3 cassette 33 is not in the cassette compartment. Cassette 33 is inserted as viewed from the upper side of FIG. 3. Further, cassette compartment outer wall 9, which is provided in such a position as to cover cassette compartment portion 8, is provided with a cavity 29 so that remote controller 7 can be stored inside cassette compartment outer wall 9. When remote controller 7 is inside cassette compartment outer wall 9 it can be ejected by pressing eject button 12. FIG. 4 shows the camcorder of FIG. 3 with cassette 33 and remote controller 7 being inserted into the camcorder.

Figure 5:
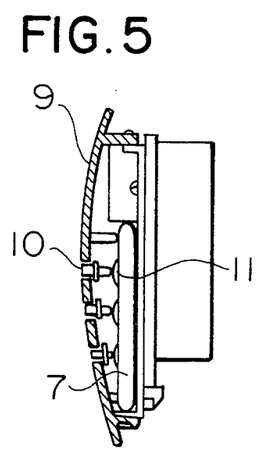
FIG. 5 is a cross-section of FIG. 4 at X—X.

FIG. 5 is a cross-sectional view of a portion of the camcorder shown in FIG. 4, taken substantially along the plane X—X. When remote controller 7 is completely stored away inside cassette compartment outer wall 9, the force produced by pushing each operating button 10 built into cassette compartment outer wall 9 is transmitted to each remote control button 11 built into remote controller 7, and thus each operating button 10 can be used even when remote controller 7 is stored in camcorder 1.

Figure 6:
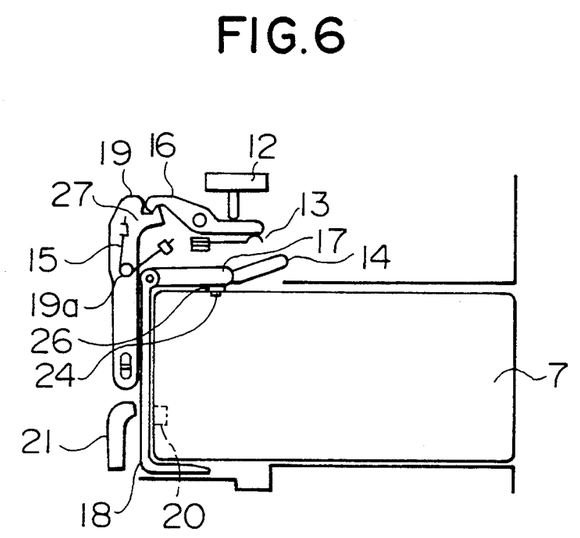
FIG. 6 is an explanatory drawing showing the relationship between the remote controller and the cassette compartment outer wall in relation to insertion and ejection of the remote controller.
Figure 7:
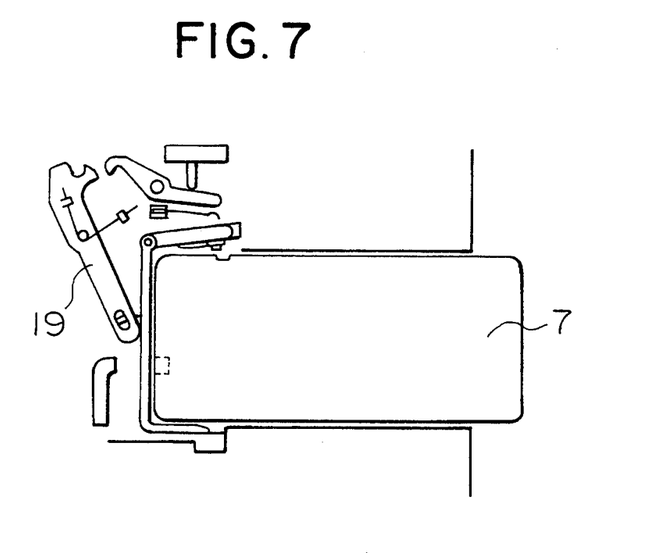
FIG. 7 is an explanatory drawing showing the relationship between the remote controller and the cassette compartment outer wall in relation to insertion and ejection of the remote controller.

FIG. 6 and FIG. 7 are explanatory diagrams showing the insertion and removal relationship between remote controller 7 and the interior of cassette compartment outer wall 9. These two illustrations are depicted as seen from the direction indicated by arrow B in FIG. 4. FIG. 6 shows remote controller 7 stored inside cassette compartment outer wall 9. Remote controller stopper 17 has catch 26, which, when it has engaged lockhole 24 (described later) of remote controller 7, keeps remote controller 7 stored inside cassette compartment outer wall 9. The movement of remote controller stopper 17 is restricted by remote controller ejecting member 19. Additionally, slide groove 14 controls the position of remote controller stopper 17. A counterclockwise spring force is applied by coil spring 15 to remote controller ejecting member 19. Locking member 16 is engaged at one end of remote controller ejecting member 19, and blade spring 13 applies a counterclockwise force to locking member 16. Locking member 16 is constructed so as to be rotatable, and eject button 12, which was explained in connection with FIG. 4, is in engagement with one end of locking member 16. Now, when remote controller 7 is to be ejected from cassette compartment outer wall 9, remote controller eject button 12 is pressed downward (as viewed in FIG. 6) and thus locking member 16 receives a clockwise rotational force and releases lock catch 27. Remote controller ejecting member 19's lock having been released, the counterclockwise force of coil spring 15 works on remote controller ejecting member 19, which therefore rotates counterclockwise on pivot 19a. As a result, remote controller stopper 17 is pushed along slide groove 14 upwards and rightwards as seen in FIG. 6, and remote controller 7 is pushed partway out of cassette compartment outer wall 9.

FIG. 7 shows remote controller 7 after it has been pushed partway out from cassette compartment outer wall 9 by remote controller ejecting member 19.

Returning to FIG. 6, remote controller 7 is provided with a light emitter 20, which is constructed so as to produce optical signals corresponding to each mode when, as shown in FIG. 5, any remote controller button 11 is pressed via its corresponding operating button 10. In FIG. 6, since a signal transmission device 21, able to transmit light, extends from the front surface of remote controller 7's light emitter 20 to the front surface of camcorder 1's light receptor 6, remote controller 7 is constructed so that a light signal emitted by light emitter 20 reaches light receptor 6, shown in FIG. 1, even when remote controller 7 is stored inside cassette compartment outer wall 9.

Figure 8:
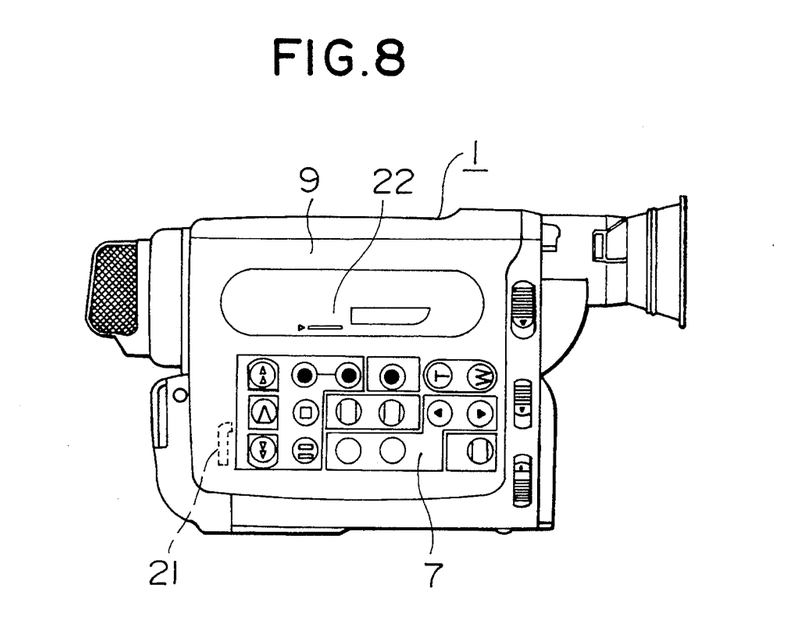
FIG. 8 is an elevation of a camcorder.
Figure 9:
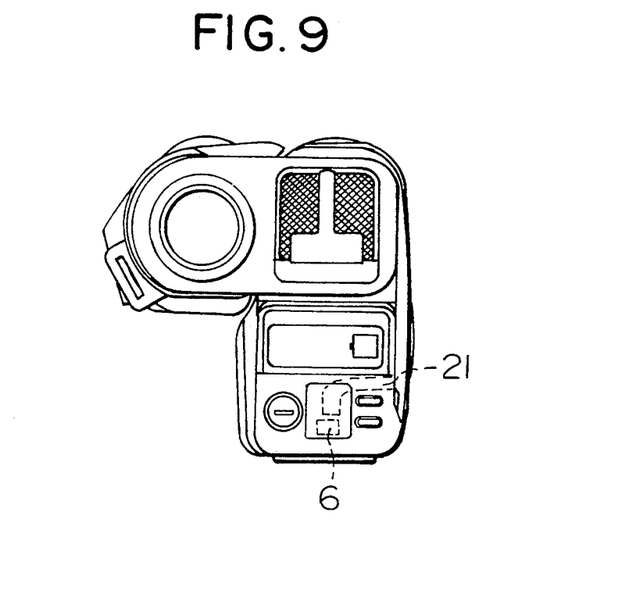
FIG. 9 is a left end view of the camcorder shown in FIG. 8.

FIG. 8 is an elevation of a camcorder 1 of the invention, and FIG. 9 is a left end view of FIG. 8. In FIG. 8, cassette compartment outer wall 9 is secured to camcorder 1, and window 22 is provided in cassette compartment outer wall 9. Thus when remote controller 7 is put in cassette compartment outer wall 9, mark 23 (explained later, and see FIG. 10) can be seen through the window 22, so that it is possible to determine whether remote controller 7 is inside. Inside cassette compartment outer wall 9, as shown in FIG. 9, light conducting member 21, serving as previously mentioned signal transmission device 21, is arranged so as to be able to transmit light to light receptor 6.

Figure 10:
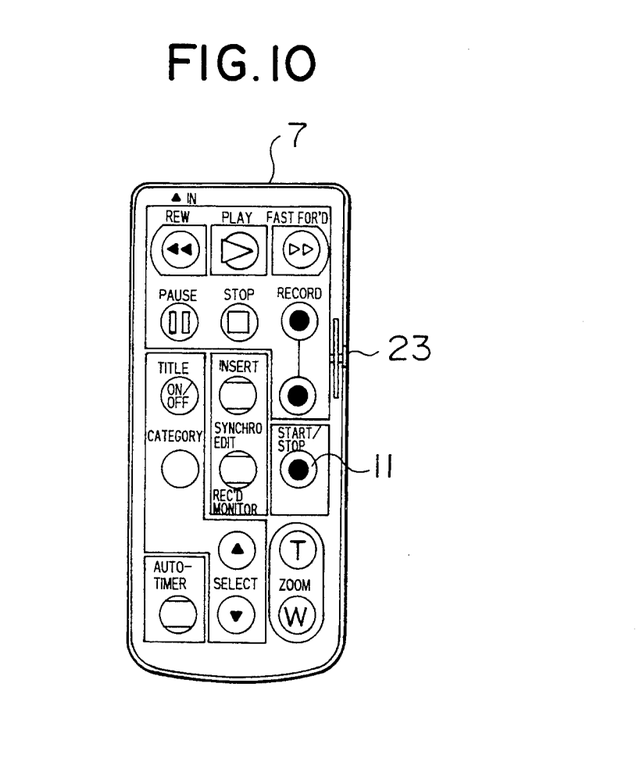
FIG. 10 is an elevation of a remote controller.
Figure 11:
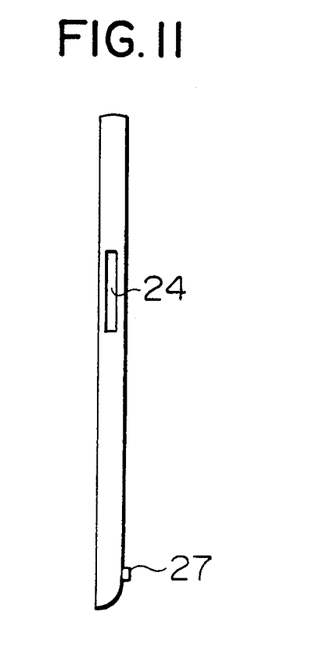
FIG. 11 is a left end view of the remote controller shown in FIG. 10.

FIG. 10 is an elevation of the previously mentioned remote controller, and FIG. 11 is a right end view of FIG. 10. Remote controller 7 has various kinds of buttons, such as a record button, play button, stop button, and zoom button. Operating buttons corresponding to these are provided in cassette compartment outer wall 9. Also, mark 23 is printed on remote controller 7 in such a way as to be visible through hole 22 mentioned above. On the side of remote controller 7, hole 24 for locking, shown in FIG. 11, is disposed in such a way that it can engage with the previously mentioned remote controller stopper 17. Rib 27 is provided at the other end.

Figure 12:
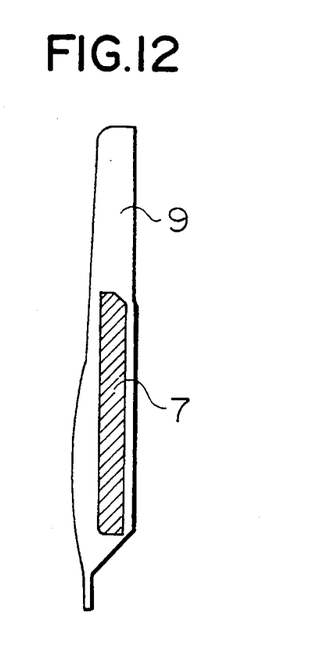
FIG. 12 is a cross-sectional view from A of remote controller 7 received in cassette compartment outer wall 9, as shown in FIG. 4.

FIG. 12 is a cross-sectional illustration showing the configuration of an opening in one end surface of cassette compartment outer wall 9 as seen from direction A in FIG. 4, illustrating how remote controller 7 engages with cassette compartment outer wall 9. Of remote controller 7's 4 corners, 2 are made with a small radius, and the other 2 with a large radius. Also 2 of the cassette compartment outer wall 9's 4 corners are made with a large radius and 2 with a small radius. Therefore, it is impossible to put remote controller 7 into cassette compartment outer wall 9 upside down. Further, since rib 27 is provided so that remote controller 7 projects out from cassette compartment outer wall 9, it is impossible to store remote controller 7 wrong end first in cassette compartment outer wall 9 even if one tries. Thus prevention of wrong-end-first insertion and upside-down insertion of remote controller 7 can be expected.

Figure 13:
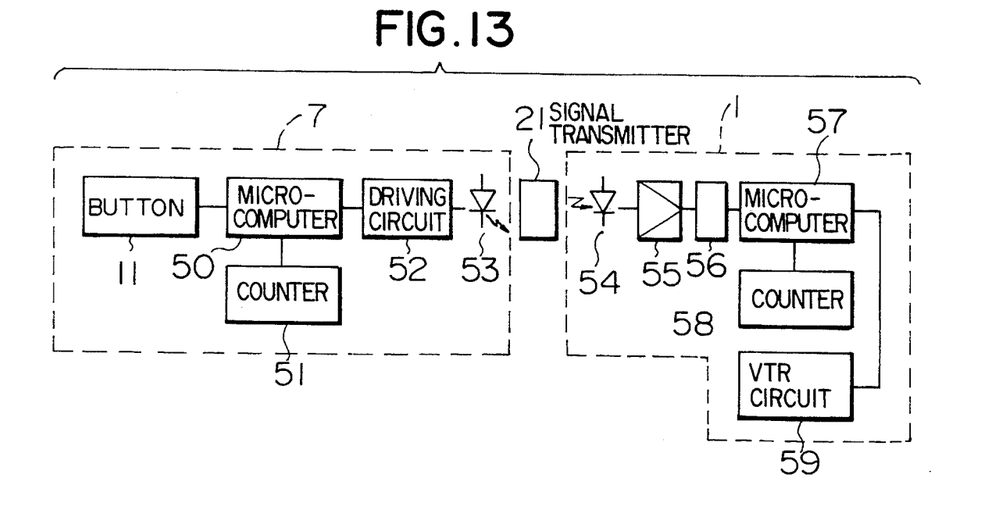
FIG. 13 is a circuit block diagram of the present invention.
Figure 14:
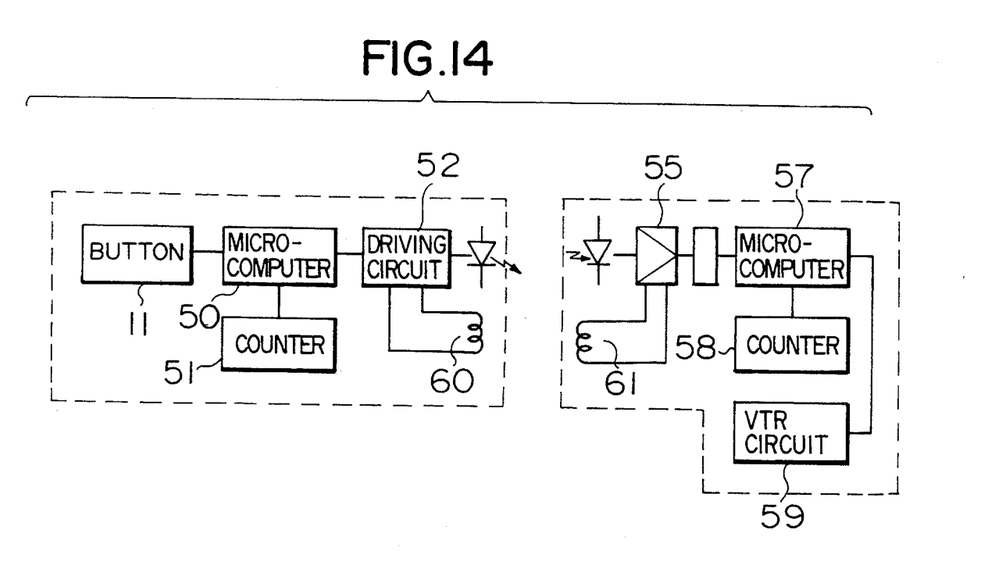
FIG. 14 is a circuit block diagram of another embodiment of the invention.

FIG. 13 is a block diagram of a remote controller 7 and camcorder 1 of the invention. Remote controller 7 has remote controller button 11, microcomputer 50, counter 51 and LED driving circuit 52. A signal input by remote controller button 11 is encoded by microcomputer 50 and counter 51 and transmitted out of remote controller 7 via LED driving circuit 52 and light emitting LED 53. Camcorder 1 has photodiode 54, amplifier 55, filter 56, microcomputer 57, counter 58 and VTR circuit 59. A light signal transmitted by remote controller 7 is transmitted to microcomputer 57 via photodiode 54, amplifier 55, and filter 56. Decoding of the code is performed, and then transmission to VCR circuit 59. Now, when remote controller 7 is stored inside cassette compartment outer wall 9, transmission of a light signal is performed through signal transmission device 21 mentioned above. Signal transmitter 21 in FIG. 13, in order to transmit light over at least a certain distance, has, for example, transparent plastic and/or optical fiber, and thus can transmit light inside itself, but the signal transmission device is not limited to signal transmission using light. Thus, in FIG. 14, the output end of LED driving circuit 52 is provided with coil 60, and the input side of camcorder 1's amplifier 55 is provided with coil 61, and signal transmission is performed by coil 60 and coil 61.

As a result of making a remote controller incorporable in an imaging device, one is released from the inconvenience of carrying the imaging device and the remote control is eliminated.

As a result of disposing a thin remote controller in the cassette compartment outer wall, it becomes easy to store the remote controller without significantly altering the size of the whole product. Further, even when the remote controller is stored inside the cassette compartment outer wall, it is possible to operate the buttons of the remote controller. Therefore, operation of the camcorder itself is possible without requiring removal of the remote controller. A further effect is that, since the remote controller is stored in a fixed place, the remote controller, which hitherto were liable to be lost, are securely stored. Also, because a mark is put on the remote controller and an opening for checking this mark is provided in the cassette compartment outer wall, it is easy to check whether the remote controller is stored inside or not. In addition, as there is a locking mechanism for keeping the remote controller in the storage position, and an ejection capability for ejecting it from the storage position, the remote controller will not be dropped through carelessness when being carried. Also, since both the insertion hole for the remote controller and the cross-section of the remote controller are of a shape preventing incorrect insertion of it, there is the effect of preventing incorrect insertion of the remote controller.

What is claimed is:

1. A camcorder comprising:
   a camera portion;
   a video cassette recorder portion adjacent to the camera portion;
   a cassette compartment in the video cassette recorder portion;
   a cassette compartment outer wall provided to the cassette compartment on said video cassette recorder portion which is selectively opened and closed when a cassette is inserted into or removed from the cassette compartment;
   a remote controller operable with the camera portion and the video cassette recorder portion; and,
   a cavity for storing said remote controller, said cavity being formed in the cassette compartment outer wall and adjacent to the cassette compartment and having a size larger than said remote controller.

2. A camcorder according to claim 1, wherein said remote controller comprises remote control buttons, and said cassette compartment outer wall comprises operating buttons which transmit pressure to the remote control buttons when the remote controller is stored in the cavity.

3. A camcorder according to claim 1, wherein said remote controller has a signal sending device and said video cassette recorder portion comprises a signal receiving device.

4. A camcorder according to claim 3, wherein said video cassette recorder portion further comprises a signal transmission device linking said signal sending device and said signal receiving device.

5. A camcorder according to claim 1, wherein said remote controller comprises a hole for locking the remote controller in the cavity, and said cassette compartment outer wall comprises a catch for engaging said hole.

6. A camcorder according to claim 1, wherein said video cassette recorder portion comprises an ejection member for ejecting said remote controller.

7. A camcorder according to claim 1, wherein said video cassette recorder portion comprises a locking mechanism for locking in place said remote controller when said remote controller is stored in the cavity, and a release button which releases the locking mechanism.

8. A camcorder according to claim 1, wherein said remote controller includes a mark thereon, and said cassette compartment outer wall has a window through which said mark can be seen when the remote controller is stored in the cavity.

9. A camcorder according to claim 1, wherein said remote controller comprises a projection for preventing incorrect insertion into the cavity.

10. A camcorder comprising:
    a camera;
    a video cassette recorder adjacent to the camera;
    a cassette compartment in the video cassette recorder;
    a cassette compartment outer wall provided to the cassette compartment;
    a remote controller operable with the camera and the video cassette recorder; and
    a remote controller storage cavity in the cassette compartment outer wall and adjacent to the cassette compartment for inserting and storing said remote controller when said cassette compartment outer wall is open.

11. A camcorder according to claim 10, wherein said remote controller comprises remote control buttons, and said video cassette recorder comprises a plurality of operating buttons and a cassette compartment outer wall opening/closing button in a different position than the operating buttons.

12. A camcorder comprising:
    a camera portion;
    a video cassette recorder portion adjacent to the camera portion;
    a remote controller operable with the camera portion and the video cassette recorder portion, said remote controller having remote control buttons;
    a cassette compartment in the video cassette recorder portion;
    a cassette compartment outer wall provided to the cassette compartment which is selectively opened and closed when a cassette is inserted into or removed from the cassette compartment;
    a cavity for storing the remote controller, the cavity being positioned in the cassette compartment outer wall; and,
    operating buttons incorporated into the cassette compartment outer wall for transmitting pressure to the remote control buttons when the remote controller is stored in the cavity.

13. A camcorder capable of being operated by a remote controller, the remote controller including remote control buttons, the camcorder comprising:
    a cassette compartment;
    a cassette compartment outer wall provided to the cassette compartment;
    a cavity disposed in the cassette compartment outer wall for storing the remote controller; and,
    operating buttons incorporated into the cassette compartment outer wall for selectively engaging the remote control buttons.

14. A camcorder which records on and plays video cassettes and which is capable of being operated by a remote controller comprising:
    a cassette compartment for holding a cassette;
    a cassette compartment outer wall defining the cassette compartment; and,
    a cavity disposed in the cassette compartment outer wall for holding the remote controller concurrently with the cassette compartment holding the cassette.

* * * * *